(12) United States Patent
Vasthimal et al.

(10) Patent No.: US 11,188,988 B2
(45) Date of Patent: Nov. 30, 2021

(54) IMAGE GENERATION FOR SOCIAL MEDIA CONTACT ENGAGEMENT

(71) Applicant: eBay Inc., San Jose, CA (US)

(72) Inventors: Deepak Kumar Vasthimal, San Jose, CA (US); Avishek Mukherjee, Yellenahalli (IN)

(73) Assignee: eBay Inc., an Jose, CA (US)

( * ) Notice: Subject to any disclaimer, the term of this patent is extended or adjusted under 35 U.S.C. 154(b) by 192 days.

(21) Appl. No.: 14/840,905

(22) Filed: Aug. 31, 2015

(65) Prior Publication Data

US 2017/0061549 A1    Mar. 2, 2017

(51) Int. Cl.
*G06Q 50/00* (2012.01)
*G06Q 10/00* (2012.01)

(52) U.S. Cl.
CPC ............ *G06Q 50/01* (2013.01); *G06Q 10/00* (2013.01)

(58) Field of Classification Search
CPC .............. G06Q 50/01; G06Q 30/0635; G06Q 30/0631; G06Q 30/02; G06Q 30/0271; G06Q 30/0208; G06Q 30/0206; G06Q 30/0215; G06Q 30/0278; G06Q 30/06; G06Q 10/00; G06Q 30/0207–0277; G06F 3/0482; G06F 1/163; G06F 16/51; G06F 3/017; G06F 16/5866; G06F 16/9535; G06F 3/04842; H04L 67/10; H04L 67/18; H04L 51/32; H04L 67/306; H04W 4/021
See application file for complete search history.

(56) References Cited

U.S. PATENT DOCUMENTS

| | | |
|---|---|---|
| 5,768,483 A | 6/1998 | Maniwa et al. |
| 8,726,312 B1 | 5/2014 | Hewinson |
| 8,799,068 B2 | 8/2014 | Kendall et al. |
| 8,867,849 B1 | 10/2014 | Kirkham et al. |
| 8,911,296 B2 | 12/2014 | Chudley et al. |
| 8,958,662 B1 | 2/2015 | Grosz et al. |
| 9,043,422 B2 | 5/2015 | Zhang |
| 9,262,764 B2 | 2/2016 | Trout et al. |
| 9,264,437 B1 | 2/2016 | Tran et al. |
| 10,366,439 B2 | 7/2019 | Leonard et al. |
| 10,666,760 B2 | 5/2020 | Vasthimal et al. |

(Continued)

OTHER PUBLICATIONS

"U.S. Appl. No. 14/840,859, Non Final Office Action dated May 8, 2017", 23 pgs.

(Continued)

*Primary Examiner* — Chinyere Mpamugo
(74) *Attorney, Agent, or Firm* — Schwegman Lundberg & Woessner, P.A.

(57) ABSTRACT

Systems and methods for image generation for social media contact engagement are provided. In example embodiments, a publication that represents an item available for purchase is identified. Item data, including an item image, for the publication is access. A plurality of images are generated for the publication using the item data. A cycling assembly of images comprising a portion of the plurality of images is assembled. The cycling assembly of images is assigned to an entity profile, corresponding to an entity associated with the publication, of a social networking service. The assignment of the cycling assembly of images causes the cycling assembly of images to be displayed to members of the social networking service in place of a member profile image.

17 Claims, 14 Drawing Sheets

(56) References Cited

U.S. PATENT DOCUMENTS

| | | |
|---|---|---|
| 2005/0131776 A1 | 6/2005 | Perotti et al. |
| 2007/0239610 A1 | 10/2007 | Lemelson |
| 2008/0077511 A1 | 3/2008 | Zimmerman |
| 2008/0082297 A1 | 4/2008 | Lundeberg et al. |
| 2008/0152107 A1 | 6/2008 | Mendiola |
| 2009/0099853 A1 | 4/2009 | Lemelson |
| 2009/0172551 A1 | 7/2009 | Kane et al. |
| 2009/0271247 A1 | 10/2009 | Karelin et al. |
| 2010/0088151 A1 | 4/2010 | Kim et al. |
| 2010/0088246 A1* | 4/2010 | Lim ................. G06Q 10/10 705/319 |
| 2010/0217645 A1 | 8/2010 | Jin et al. |
| 2011/0184780 A1 | 7/2011 | Alderson et al. |
| 2012/0150592 A1* | 6/2012 | Govrik .............. G06Q 30/0207 705/14.1 |
| 2012/0209749 A1 | 8/2012 | Hammad et al. |
| 2012/0232954 A1 | 9/2012 | Caiman et al. |
| 2013/0086079 A1 | 4/2013 | Chaudhuri et al. |
| 2013/0097285 A1 | 4/2013 | Van Zwol et al. |
| 2013/0124670 A1 | 5/2013 | Thakur et al. |
| 2013/0198210 A1 | 8/2013 | Lee et al. |
| 2013/0204754 A1 | 8/2013 | Brelig et al. |
| 2013/0238732 A1 | 9/2013 | Zhang |
| 2013/0262273 A1 | 10/2013 | Cao |
| 2013/0262316 A1 | 10/2013 | Hruska |
| 2013/0268357 A1 | 10/2013 | Heath |
| 2013/0282808 A1 | 10/2013 | Sadanandan et al. |
| 2014/0028688 A1 | 1/2014 | Houjou et al. |
| 2014/0125823 A1 | 5/2014 | Johnson et al. |
| 2014/0279072 A1 | 9/2014 | Joseph |
| 2014/0310713 A1 | 10/2014 | Kaldor |
| 2015/0199717 A1* | 7/2015 | Davis ................. G06Q 30/0277 705/14.53 |
| 2015/0254711 A1* | 9/2015 | Chand ................ G06Q 30/0269 705/14.53 |
| 2015/0256899 A1 | 9/2015 | Chand et al. |
| 2015/0334219 A1 | 11/2015 | Soundararajan |
| 2015/0363758 A1 | 12/2015 | Wu et al. |
| 2015/0371015 A1 | 12/2015 | Garcia Manchado |
| 2016/0021179 A1* | 1/2016 | James .................... G06Q 10/10 709/204 |
| 2016/0055504 A1 | 2/2016 | Murray |
| 2016/0171584 A1 | 6/2016 | Cao |
| 2016/0313790 A1 | 10/2016 | Clement |
| 2017/0032311 A1 | 2/2017 | Rizzolo et al. |
| 2017/0064034 A1 | 3/2017 | Vasthimal et al. |
| 2019/0281357 A1 | 9/2019 | Hogan et al. |
| 2020/0244761 A1 | 7/2020 | Vasthimal et al. |

OTHER PUBLICATIONS

Non-Final Office Action received for U.S. Appl. No. 14/840,859, dated Jun. 1, 2018, 15 pages.
Advisory Action received for U.S. Appl. No. 14/840,859, dated Feb. 5, 2018, 3 pages.
Applicant Initiated Interview Summary received for U.S. Appl. No. 14/840,859, dated Aug. 14, 2017, 3 pages.
Final Office Action received for U.S. Appl. No. 14/840,859, dated Nov. 17, 2017, 15 pages.
Response to Final Office Action filed on Jan. 22, 2018 for U.S. Appl. No. 14/840,859, dated Nov. 17, 2017, 12 pages.
Response to Final Office Action filed on Mar. 16, 2018 for U.S. Appl. No. 14/840,859, dated Nov. 17, 2017, 13 pages.
Response to Non-Final Office Action filed on Aug. 8, 2017 for U.S. Appl. No. 14/840,859, dated May 8, 2017, 20 pages.
Final Office Action received for U.S. Appl. No. 14/840,859, dated Jan. 8, 2019, 14 pages.
Applicant Initiated Interview Summary Received for U.S. Appl. No. 14/840,859, dated Mar. 7, 2019, 3 pages.
Response to Final Office Action filed on Mar. 8, 2019, for U.S. Appl. No. 14/840,859, dated Jan. 8, 2019, 13 pages.
Advisory action received for U.S. Appl. No. 14/840,859 dated Mar. 28, 2019, 3 pages.
"U.S. Appl. No. 14/840,859, Response filed Aug. 27, 2018 to Non Final Office Action dated Jun. 1, 2018", 12 pgs.
Applicant Initiated Interview Summary Received For U.S. Appl. No. 14/840,859, dated Jul. 8, 2019, 3 pages.
Final Office Action Received for U.S. Appl. No. 14/840,859, dated Nov. 22, 2019, 16 pages.
Non-Final Office Action received for U.S. Appl. No. 14/840,859, dated May 14, 2019, 22 pages.
Response to Non-Final Office Action Filed on Aug. 12, 2019, for U.S. Appl. No. 14/840,859 dated May 14, 2019, 14 pages.
Corrected Notice of Allowability received for U.S. Appl. No. 14/840,859, dated Apr. 27, 2020, 2 pages.
Notice of Allowance received for U.S. Appl. No. 14/840,859, dated Mar. 27, 2020, 20 Pages.
Response to Final Office Action filed on Feb. 24, 2020 for U.S. Appl. No. 14/840,859, dated Nov. 22, 2019, 14 pages.
Non-Final Office Action received for U.S. Appl. No. 16/850,791, dated Sep. 10, 2021, 19 Pages.

* cited by examiner

IMAGE GENERATION FOR SOCIAL MEDIA CONTACT ENGAGEMENT

TECHNICAL FIELD

Embodiments of the present disclosure relate generally to generating personalized profile content such as a profile image and, more particularly, but not by way of limitation, to image generation for social media contact engagement.

BACKGROUND

Entities, such as businesses, organizations, and individuals, often engage with members of a social networking service to increase awareness of a particular event, product, or the entity itself. However, directly or actively interfacing with members of a social networking service via direct messages or similar direct communications can be a nuisance to the members and detract from user experience.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
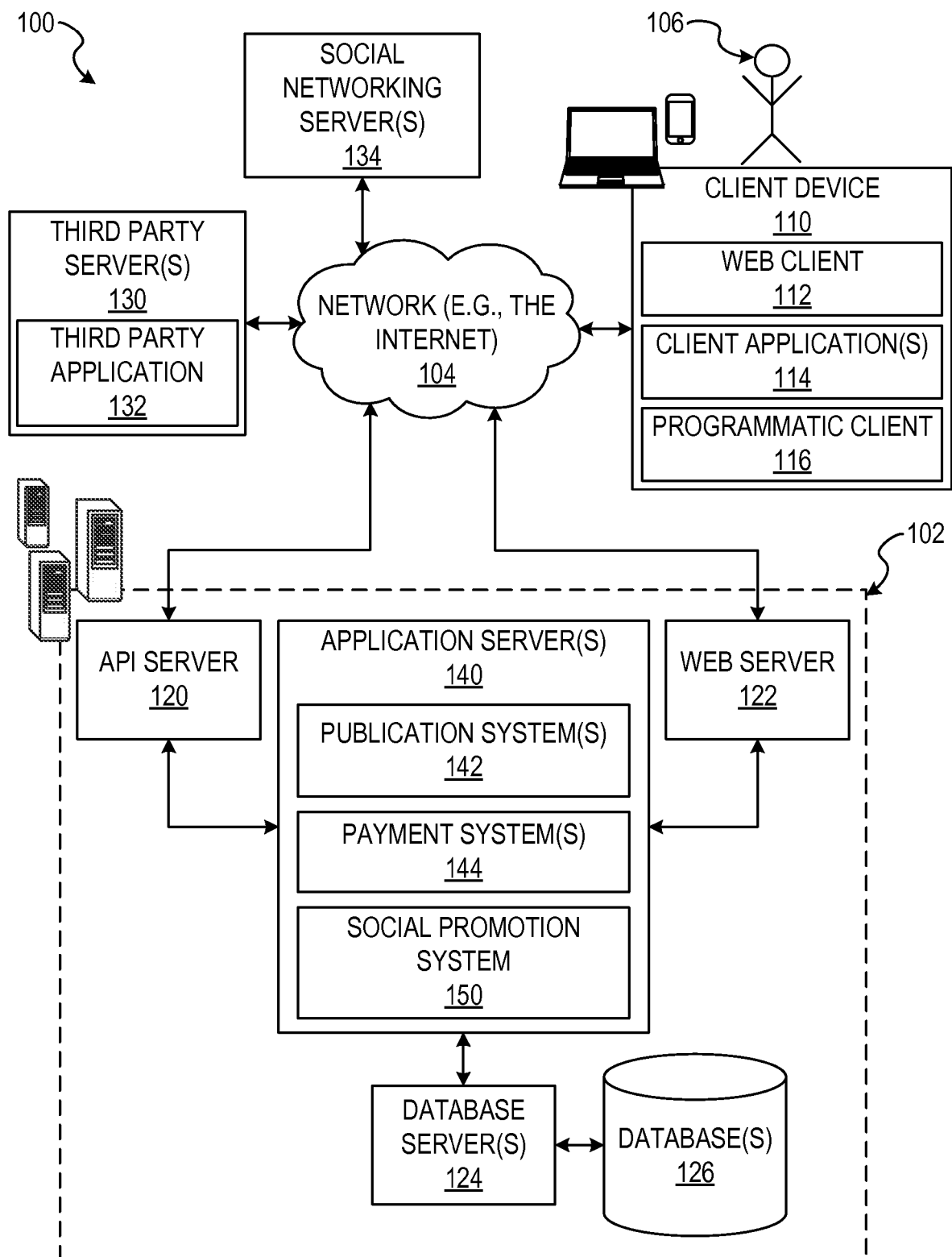
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A variety of challenges arise when attempting to promote products or services using social networking services and social messaging services. For example, an advertising campaign by an entity (e.g., business, organization, or person) using social networking service to promote a particular product can be a nuisance or irritating to a target audience of the advertising campaign when using advertisement banners that use a portion of the display screen, direct messages, popup advertisements, or other types of traditional online advertisements. Described below is an approach for passively engaging with members of a social network service to increase awareness of events, products, or services using social networking services that are personalized to a particular member. Such passive engagement techniques can promote awareness without detracting from a user experience.

In various example embodiments, a social promotion system identifies a publication on a publication system such as an item listing that represents an item available for purchase. For example, the social promotion system identifies a particular item listing on an e-commerce website (e.g., EBAY®). In some instance, the social promotion system identifies item listings for items that are for sale at a discounted price or are otherwise being promoted. The social promotion system accesses various item data or publication data including item images for the item of the item listing. For example, the item images can comprise a photograph of the particular product of the item listing. In further embodiments, the item data comprises item price, description, dimensions, inventory, purchase history, and so on.

In various example embodiments, the social promotion system generates a profile content such as a profile image using the item data. For example, the social promotion system generates the profile image comprising a depiction of the item of the item listing and an indication of a discount or other special promotional information associated with the item (e.g., text included in the image show the discount percentage). In other embodiments, the social promotion system generates other profile content such as text and images for posts or updates. The social promotion system assigns the profile image, or communicates the other profile content, to an entity profile corresponding to an entity associated with the item listing on a social networking service (e.g., the profile image is assigned to an entity account of the entity on the social networking service). In these embodiments, the profile image is viewable by members of the social networking service (displayed or presented to contacts members or other members having a relationship with the entity on the social network service). That is to say, the assignment of the profile image to the entity profile causes the profile image to be displayed to members of the social networking service in place of a member profile image. In other words, the assignment of the profile image to the entity profile causes the profile image to be displayed to members of the social networking service as part of a list of social network profile images that includes social contacts of a viewing user. For example, if a particular member of the social networking service has formed a relationship with the entity on the social networking service, the particular member can view the profile image of the entity profile when browsing their contacts on the social networking service. In these embodiments, the profile image may be specific to the particular member. In other words, the social promotion system assigns the profile image such that a portion of contact members of the entity view a different profile image that has been personalized based on member data for the portion of the contact members. That is to say, the first member may view a first profile image of the entity account on the social networking service based on member data of the first member (e.g., personalized to the first member based on member data such as purchase history, geolocation, current job title, likes, connections, posts, and so forth) and a second member may view a second profile image of the entity account based on member data of the second member, the first profile image and the second profile image being generated by the social promotion system.

In other example embodiments, the social promotion system identifies one or more an item listing that represent items available for purchase (e.g., an item listings on an e-commerce website) and accesses item data for respective item listing of the one or more item listings (e.g., item images, price, description, and available inventory) in a similar way as that described above. The social promotion system generates a plurality of images for respective item listings of the one or more item listings. Subsequently, the social promotion system assembles a collage or cycling assembly of images comprising a portion of the plurality of images. For example, the cycling assembly of images can comprise depictions of different products for different item listing and promotional information associated with the different products. The cycling assembly of images can comprise, for example, a GIF (Graphic Interchange Format), a video, an animation, or another type of assembly comprising multiple images that cycle.

The social promotion system assigns the cycling assembly of images to the entity profile on the social networking service similar to that described above for the profile image. For instance, the social promoting system assigns an assembled GIF of current item promotions to a profile image that is representative of the entity profile or entity account on the social network service. In this way, a particular member of the social networking service that has formed a relationship with the entity on the social networking service (e.g., a contact member of the entity) views the GIF in a similar manner to viewing a profile photo for a contact (e.g., a friend or follower on the social networking service) of the particular member on the social networking service. In some embodiments, the social promotion system cycles the images of the cycling assembly of images in response to a trigger (e.g., a time based trigger or a member engagement action trigger).

In further embodiments, the social promotion system accesses member data of contact members of the entity (e.g., friends or followers of the entity on the social networking service). The social promotion system personalizes the profile image or cycling assembly of images based on the accessed member data. For instance, the social promotion system selects a product image for the profile image based on interests specified in the member data.

In still further embodiments, the social promotion system can receive and respond to interactions with the entity by members of the social network service. For instance, a particular member of the social networking service can message the entity and receive a response that includes information pertaining to the item depicted in the profile image. In some embodiments, the particular member can initiate a purchase of the item associated with the profile image (e.g., a link to facilitate the purchase of the item can be sent to the particular member in response to a message sent by the member to the entity).

In this way, the social promotion system generates profile content pertaining to the item listing for the entity on the social networking service. The profile content is personalized to contact member of the entity and viewable by contact members. The social promotion system can also facilitate a purchase of the item listing. Such as a promotion scheme is not as intrusive as a direct message, popup advertisement, or advertising banner that consumes display space.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Wash. State), client applications 114, and a programmatic client 116 embodied on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a social promotion system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital goods information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

In various embodiments, a social networking server 134 is communicatively coupled to the client device 110, the third party servers 130, and the applications servers 140 via the network 104. In these embodiments, the social promotion system 150 communicates messages to members of a social networking service via the social networking service hosted on the social networking server 134. The social promotion system 150 can update and access various data stored by the social networking service hosted by the social networking server 134. For instance, the social promotion system 150 can post updates, update a profile image of an entity account on the social networking service, access member data of contacts of the entity prolife of the entity or the entity account of the entity on the social networking service, and so on. In alternative embodiments the social networking service is hosted by, or is otherwise a part of, the application servers 140 and the social promotion system 150.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the social promotion system 150 provides functionality to identify item listings personalized to a particular member of a social networking service, generate profile content for the identified item listings, assign the profile content to an entity account on the social networking service, and facilitate a purchase of an item in the item listing among other functionality described herein. In some example embodiments, the social promotion system 150 communicates with the client device 110, the third party server(s) 130, the publication system(s) 142 (e.g., retrieving listings), and the payment system(s) 144 (e.g., purchasing an item in a listing). In an alternative example embodiment, the social promotion system 150 is a part of the publication system(s) 142. The social promotion system 150 will be discussed further in connection with FIG. 2 below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as stand-alone software programs, which do not necessarily have networking capabilities.

Figure 2:
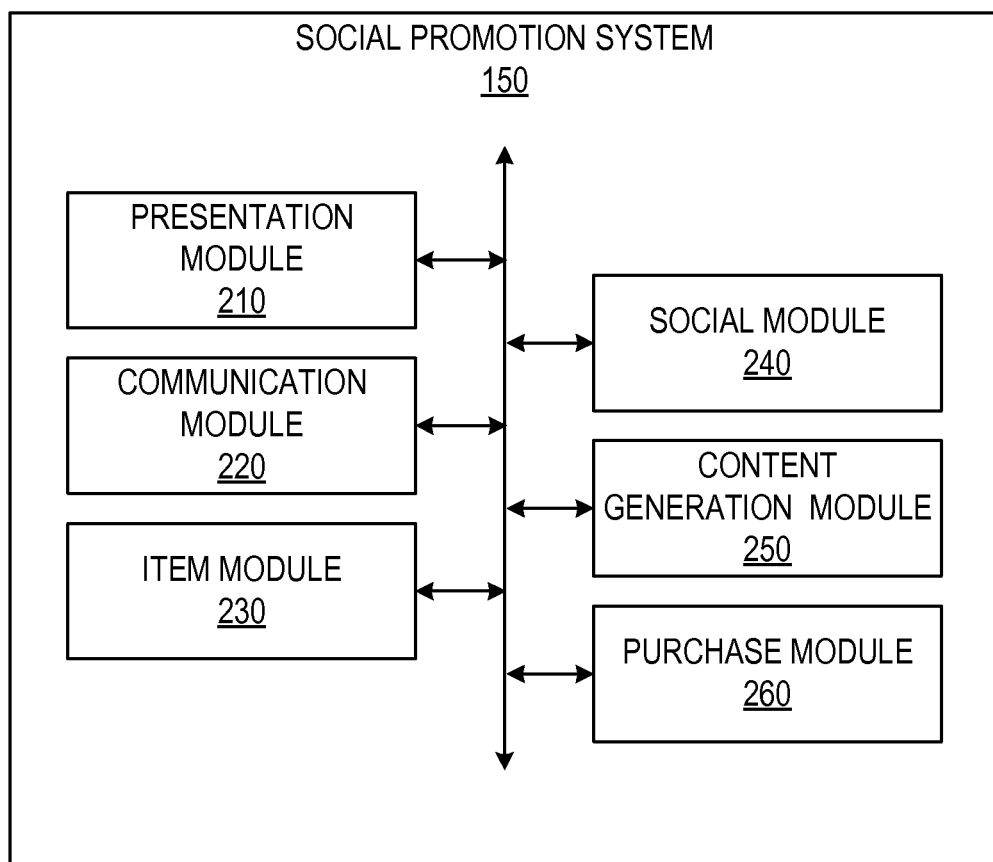
FIG. 2 is a block diagram illustrating an example embodiment of a social promotion system, according to some example embodiments.

FIG. 2 is a block diagram of the social promotion system 150 that provides functionality to identify item listings personalized to a particular member of a social networking service, generate profile content for the identified item listings, assign the profile content to an entity account on the social networking service, and facilitate a purchase of an item in the item listing among other functionality described herein, according to some example embodiments. In an example embodiment, the social promotion system 150 includes a presentation module 210, a communication module 220, an item module 230, a social module 240, a content generation module 250, and a purchase module 260. All, or some, of the modules 210-260 of FIG. 2, communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

In some embodiments, the presentation module 210 provides various presentation and user interface functionality operable to interactively present (or cause presentation) and receive information from the user. For instance, the presentation module 210 causes presentation of generated profile content, generated messages, identified publications and item listings, notifications, and other generated user interfaces. In various implementations, the presentation module 210 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors). It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In various example embodiments, the network communication can operate over wired or wireless modalities. Web services are intended to include retrieving information from the third party server(s) 130, the database(s) 126, and the application server(s) 140. In some embodiments, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The item module 230 provides functionality to identify publications such as item listings, access publication data or item data for the item listings, and various other functionality associated with the item listings. For example, the item module 230 identifies publications or item listings for items that are currently being discounted or otherwise promoted. The item module 230 can identify items that may be of interest to a particular contact member of the entity profile on the social networking service.

The social module 240 provides functionality to access various member data on the social networking service (e.g., hosted on the social networking server 134 of FIG. 1) and perform various actions associated with the social networking service. For example, the social module 240 identifies a plurality of members that are similar to a particular member (e.g., by matching or nearly matching demographic data, interests, connections, and so on) and access member data for the identified plurality of members. In another example, the social module 240 assigns generated profile content to the entity profile on the social networking service (e.g., assigning a profile image to the entity profile).

The content generation module 250 provides functionality to generate profile content using a variety of data. For example, the content generation module 250 generates profile content using item data, member data, and other data from third party servers. In a specific example, the content generation module 250 generates a profile image using item image included in the item data. The content generation module 250 can select a particular item image based on the member data accessed from the social networking service. The profile content includes profile images, posts, updates, likes, or other profile entries comprising text, images, videos, links, or other media types.

The purchase module 260 provides functionality to facilitate a purchase of an item corresponding to a publication or an item listing. For example, responsive to a message received from a particular member on the social networking service, the purchase module 260 initiates a purchase of the item corresponding to the item listing.

Figure 3:
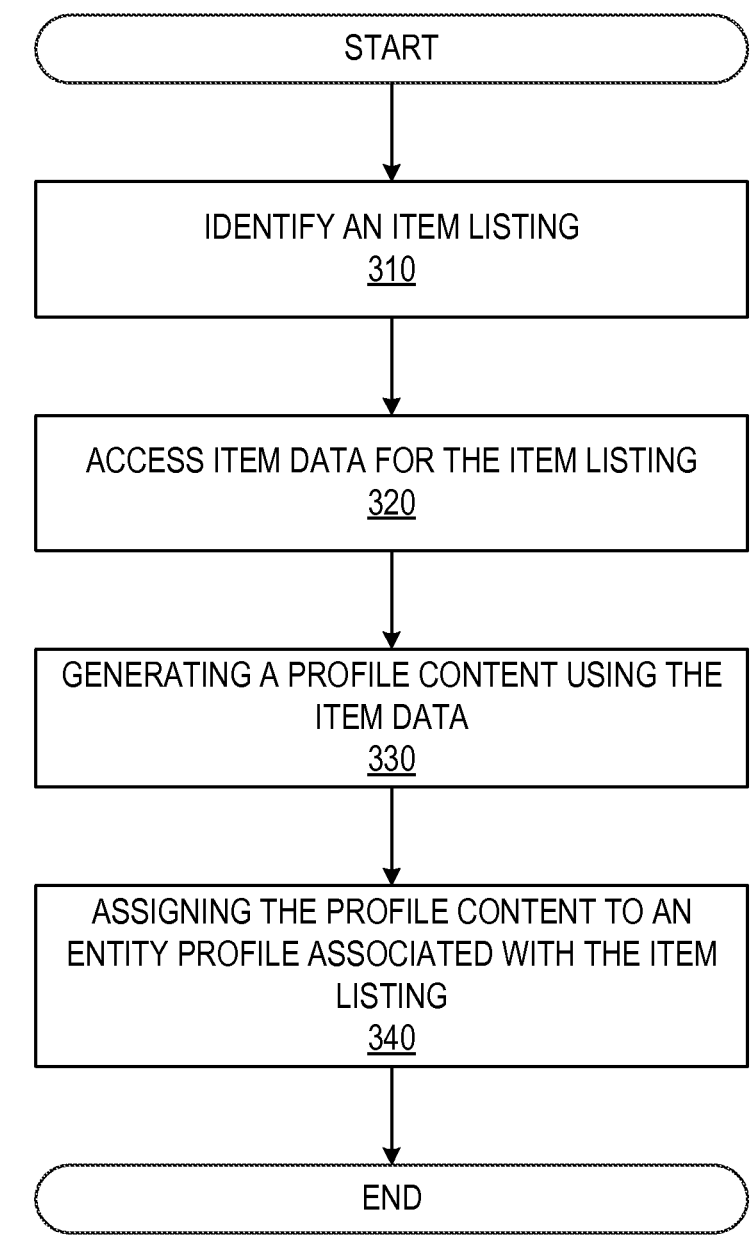
FIG. 3 is a flow diagram illustrating an example method for identifying a publication such as an item listing and generating profile content for the item listing, according to some example embodiments.

FIG. 3 is a flow diagram illustrating an example method 300 for identifying a publication such as an item listing and generating profile content for the item listing. The operations of the method 300 can be performed by components of the social promotion system 150, and are so described below for the purposes of illustration.

At operation 310, the item module 230 identifies the publication such as the item listing that represents an item available for purchase. For example, the item module 230 accesses a plurality of publications or item listings from the data storage of on an e-commerce website or another online merchant, and identifies one or more item listings. In this example, the item module 230 identifies item listings that are currently being sold at a discounted price or are otherwise being promoted. That is to say, the item module 230 identifies a particular item listing comprising a discounted item listing for an item at a reduced price. In some embodiments, the item module 230 identifies item listing that may be of interest to a particular contact member, or group of contact members, of an entity profile on a social networking service. As will be described in more detail below, the item module 230 identifies the publication using various data such as item data and member data from the social networking service.

Figure 4:
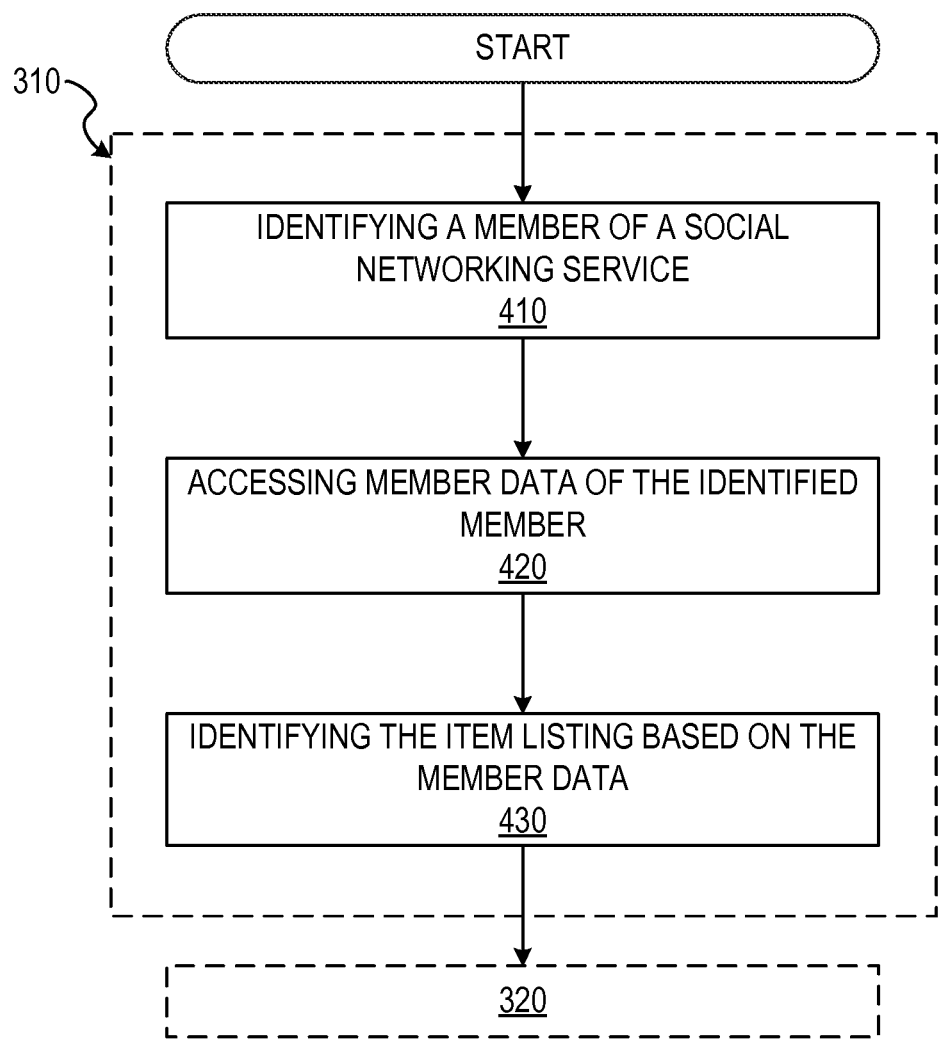
FIG. 4 is a flow diagram illustrating further example operations for identifying the item listing, according to some example embodiments.

Turning now to FIG. 4, a flow diagram illustrating further example operations for identifying the item listing is shown. In some embodiments, operation 310 includes the operations of FIG. 4.

At operation 410, the social module 240 identifies a member of the social networking service that has formed a relationship with the entity on the social networking service (e.g., a contact member of the entity on the social networking service). For example, the social module 240 on the application server 140 performs an API call with an account identifier for an entity and account credentials to the social network server 134 that hosts the social networking service. In this example, the social networking service responds to the API call by providing a list of members that are social connected with the account corresponding to the account identifier. Each member has formed a relationship with the entity on the social networking service, for example, by following, friending, liking, or otherwise connecting with the entity on the social networking service. Herein, members of the social networking service that have formed a relationship with the entity on the social networking service are referred to as contact members of the entity.

At operation 420, the social module 240 accesses member data of the contact member from a data storage of the social networking service. The member data can include a wide variety of data associated with the contact member. For example, the member data can include, interests, posts, likes, contacts of the contact member on the social networking service, job history, purchase history, member images, and so on.

At operation 430, the item module 230 identifies the item listing based at least in part on the member data of the contact member. For example, the item module 230 matches an interest or hobby indicated by the member data with an item listing (e.g., ski equipment for member data indicating an interest in skiing or other cold weather sports). In some embodiments, the social module 240 identifies similar members to the contact member (e.g., members with matching or nearly matching interests, demographic data, or other member data to the identified member) on the social networking service and accesses member data of the identified similar members. In some embodiments, the identified similar members are contact members of the entity profile and in other embodiments, the identified similar members are not necessarily contact members of the entity. In these embodiments, the item module 230 identifies the item listing using the member data of the identified similar members.

Turning again to FIG. 3, at operation 320, the item module 230 accesses item data for the identified item listing. For instance, the item data can include item images (e.g., product images, product use images, or other images associated with the item), item price, description, dimensions, weight, inventory, purchase history data, item material (e.g., non-toxic, hypoallergenic, or another material attribute), model, brand, seller, manufacturing origin, shipping origin, estimated time to ship, estimated tax, discount information, coupon information, sale price, other promotional information, other item characteristics (e.g., color, pattern, sale price), and so forth. In some embodiments, the item module 230 accesses the item data from the data storage of the e-commerce website or online merchant and in other embodiments, the item module 230 retrieves the item data from the third-party servers 130.

At operation 330, the content generation module 250 generates profile content using the accessed item data for the item listing. The profile content is intended to include images (e.g., a profile image for the entity account), text, posts, an action (e.g., performing a like), a cycling assembly of images (e.g., a GIF, video, or animation), links, a member entry update, or another update that modifies a data store corresponding to a particular account or profile of the social networking service. The content generation module 250 can generate a variety of profile content using the item data. For example, the content generation module 250 can generate a profile image that includes item images from the item data. In another example, the content generation module 250 can generate a cycling assembly of images or a collage of images using the item data (as described below in connection with FIG. 5). In still other examples, the content generation module 250 can generate profile content such as posts, message responses, updates, and other content for the entity profile on the social networking service. In a specific example, the content generation module 250 generates a profile image that includes an indication of a reduced price, sale price, or other promotional information pertaining to the item of the item listing.

In further embodiments, the content generation module 250 generates the profile image based on a textual description of the item listing. For instance, the content generation module 250 generates the profile image with a tattered or worn image filter for a used item that the textual description included in the item data indicates the used item is in poor condition. In another instance, the content generation module 250 generates a profile image that is a snippet of the textual description included in the item data for the item listing and a coloring of the text and background of the profile image is determined based on a color of the item as indicated by the item data. That is to say, the item module 230 or the content generation module 250 extract item characteristics or item attributes from the item data and the content generation module 250 generates the profile content using the extracted item characteristics or the item attributes.

In still other embodiments, the content generation module 250 generates the profile content, such as a profile image using other contextual data. For example, the content generation module 250 generates the profile image using warm colors, or a summer themed background (e.g., a beach scene background) if the member is near a geolocation where it is currently summer.

In some example embodiments, similar to that discussed above in connection with operations 410 and 420 of FIG. 4, the social module 240 identifies one or more contact members of the entity on the social networking service and accesses member data for the identified contact members on the social networking service. In these embodiments, the content generation module 250 generates the profile content (e.g., a profile image or a cycling assembly of images) based in part on member data of the contact member of the social networking service. For instance, if the member data indicates a size or gender of the contact member, the content generation module 250 generates the profile image to include product images specific to the size and gender of the member (e.g., appropriately sized clothing based on the size of the member indicated in the member data).

In an embodiment where the content generation module 250 generates the cycling assembly of images, the content generation module 250 orders the images of the cycling assembly of images base in part on the member data of the contact member. For example, the member data indicates a preference for a particular brand, the content generation module 250 can order the images such that an image that indicates brand of the item is order first in the cycling assembly of images.

Figure 5:
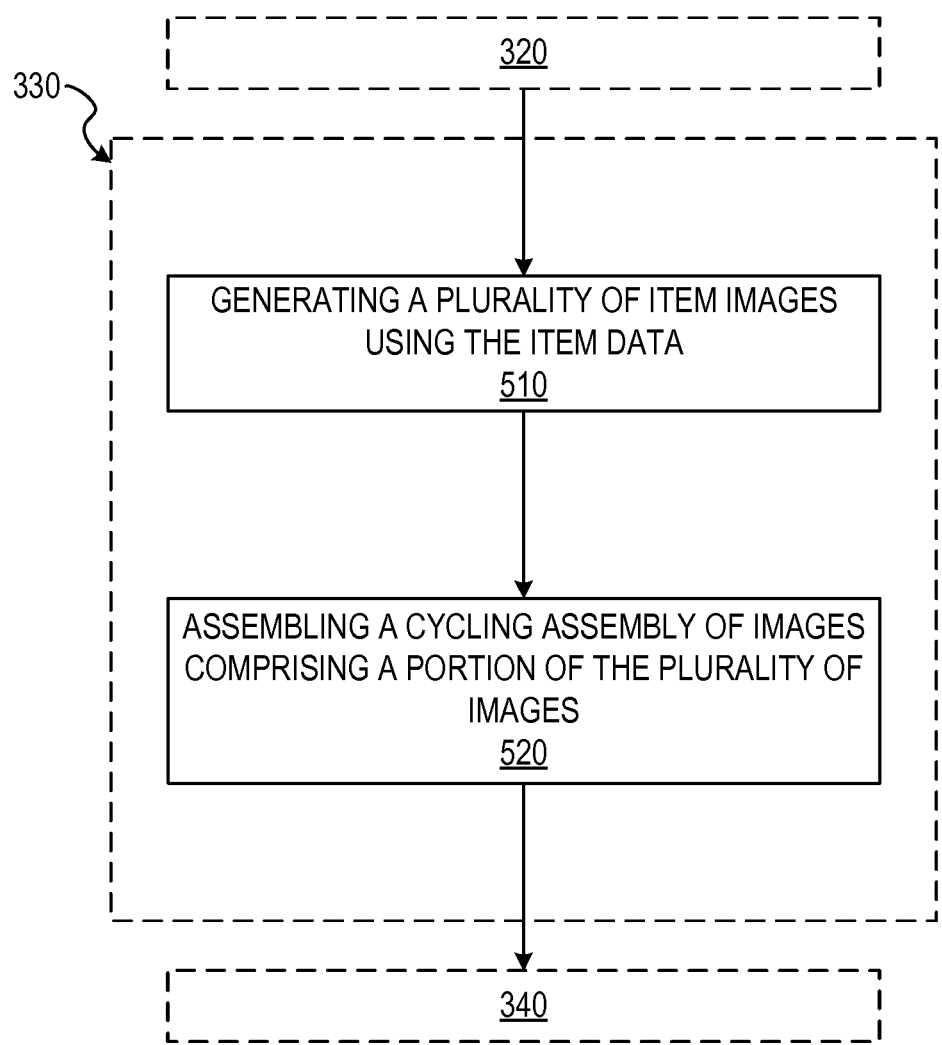
FIG. 5 is a flow diagram illustrating further example operations for generating profile content for the item listing, according to some example embodiments.

Turning now to FIG. 5, a flow diagram illustrating further example operations for generating profile content for the item listing is shown. At operation 320, the item module 230 accesses item data for the identified item listing. Subsequently, the content generation module 250 generates profile content at operation 330. In some example embodiments, operation 330 includes the operations of FIG. 5.

At operation 510, the content generation module 250 generates a plurality of cycle images for the item listing using the item data. For example, the content generation module 250 generates different cycle images using different item images included in the item data.

In another example embodiment, the item module 230 identifies multiple item listings that respectively represent multiple items available for purchase and accesses item data for respective item listings among the multiple item listings, similar to operations 310 and 320 discussed above. The content generation module 250 generates different cycle images using item data from the different identified item listings. In some embodiments, the content generation module 250 generates a particular cycle image for each of the multiple item listings using the item data for respective item listings.

At operation 520, the content generation module 250 assembles a cycling assembly of images, a circulating group of images, or a collage of images that comprises a portion of the generated plurality of cycle images. For example, the content generation module 250 generates a GIF, a video, or another type of animation using the generated plurality of cycle images. In some embodiments, the content generation module 250 assembles the cycling assembly of images comprising the generated cycle images generated for at least two different item listings.

In further example embodiments, the content generation module 250 causes an adjustment, change, cycle, iteration, or other modification of the cycle images or order of the cycle images in the cycling assembly of images in response to a cycle trigger. For instance, the cycle trigger is triggered in response to a member action associated with the entity profile of the social networking service, in response to a period of time expiring, in response to a detecting a changes in a current geolocation of a member of the social networking service, or in response to other such events. In a specific example, the content generation module 250 configures the cycling assembly of images periodically (e.g., every 3 seconds), or based on another type of temporal trigger, to show a different one of the images of the cycling assembly of images (e.g., in a fixed order or in a random order). In another example, the communication module 220 or the social module 240, detecting a particular contact member of the entity moving within a specified geolocation boundary (e.g., a specified radius around a particular geolocation such as a 10 meter radius around a certain coffee shop), can cause the content generation module 250 to reorder the images of the cycling assembly of images. In still another example, the content generation module 250 reorders or modifies the cycling assembly of images to coincide with when a particular promotional sale ends (e.g., no longer displaying a promotional price once the promotion has ended).

Figure 6:
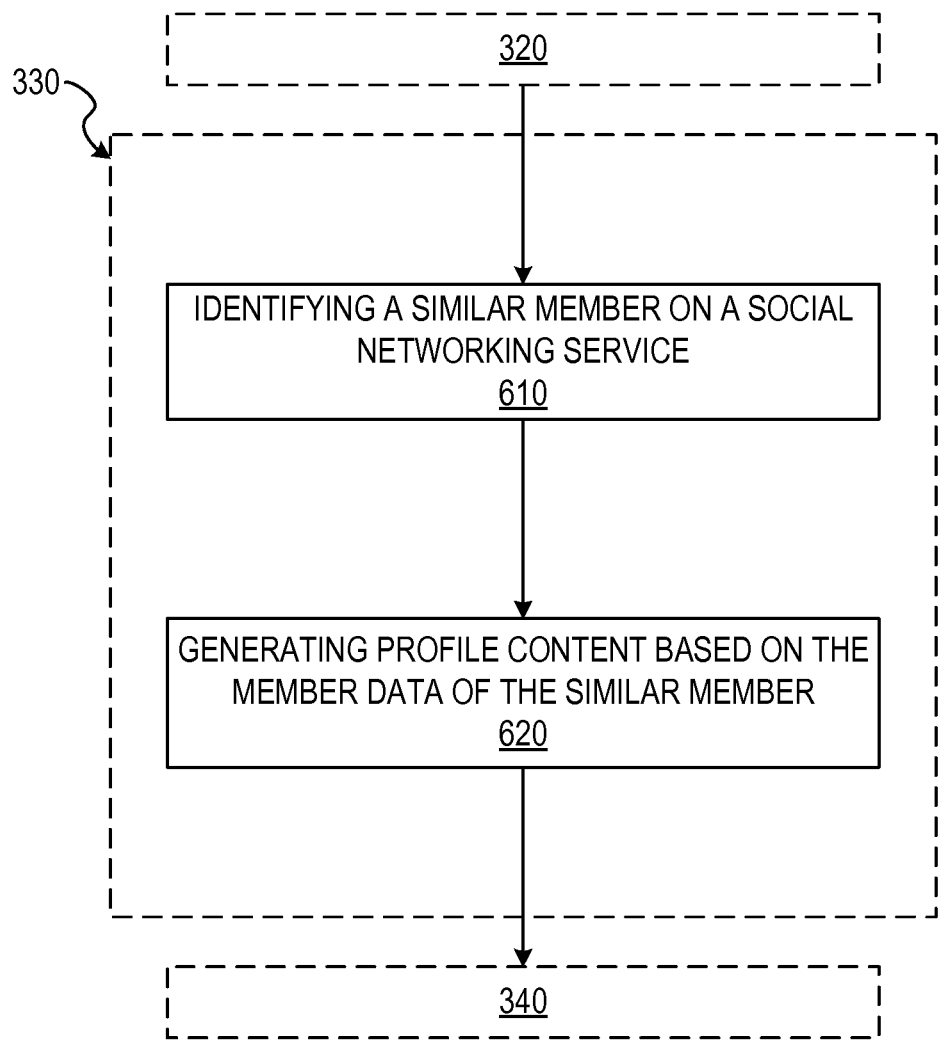
FIG. 6 is a flow diagram illustrating further example operations for generating profile content for the item listing, according to some example embodiments.

Turning to FIG. 6, a flow diagram illustrating further example operations for generating profile content for the item listing is shown. At operation 320, the item module 230 accesses item data for the identified item listing. Subsequently, the content generation module 250 generates profile content at operation 330. In some example embodiments, operation 330 includes the operations of FIG. 6.

As discussed above, the social module 240 identifies one or more contact members of the entity on the social networking service and accesses member data for the identified contact members on the social networking service. At operation 610, the social module 240 identifies a similar member on the social networking service that is similar to the identified contact member (e.g., a particular member with matching or nearly matching member data to the identified member). For example, the social module 240 compares the member data of the identified member with member data of candidate similar members to identified members that are similar to the identified member. The social module 240 can score candidate similar members based on matches, or near matches, between member data of the identified member and the candidate similar member (e.g., same or similar age, socioeconomic status). The social module 240 then identifies the similar member as the highest scoring candidate similar member.

At operation 620, the content generation module 250 generates profile content based in part on the member data of the identified similar member. For example, the content generation module 250 generates the profile image personalized to the particular member. For example, the content generation module 250 infers a preference for a particular brand of product based on the member data of the similar members (e.g., the member data includes posts mentioning a particular brand name or the member "liking" a particular product or brand). The content generation module 250 then generates the content, such as a profile image, based on the inferred preference. Using the member data of the similar member can be useful in a scenario where the member data of the contact member for which the content generation module 250 is personalizing the generated profile content for, is missing, is limited, or is less descriptive of particular aspects of the member (e.g., few interest or hobbies indicated by the member data or too few posts or likes indicated by the member data).

Turning back to FIG. 3, at operation 340, the social module 240 assigns the profile content (e.g., the generated profile image or the generated cycling assembly of images) to an entity profile on the social networking service. The entity profile is associated with the item listing (e.g., an online retail or merchant that hosts the item listing). For example, the social module 240 assigns the profile image generated by the content generation module 250 to the entity profile (e.g., the image that is viewable by contact members of the entity). That is to say, the social module 240 updates a data store, causing a change to the data store, corresponding to the entity profile on the social network system. The social module 240 assigns the profile content to the entity profile, for example, via API calls or other communication with the social networking service. In a specific example, the content generation module 250 generates a profile image for the entity profile and the social module 240 assigns the profile image to the entity profile on the social networking service. In this example, the social module 240 assigns the profile image to the entity profile such that the profile image is representative of the entity account and is viewable where a contact photo of a contact member might otherwise be viewable. The assignment of the profile image or the cycling assembly of images to the entity profile causes the profile image to be displayed to members of the social networking service in place of a member profile image (e.g., viewable where a profile facial image of a member of the social networking service may normally be viewable). In other words, the assignment of the profile image to the entity profile causes the profile image to be displayed to members of the social networking service as part of a list of social network profile images that includes social contacts of a viewing user (e.g., a contact member of the entity viewing the entity profile on the social networking service).

While a particular profile image assigned to the entity profile by the social module 240 is viewable to a particular contact member, a different profile image for the entity profile can be viewable by other member of the social networking service or different contact members. Put another way, the content generation module 250 generates a plurality of different profile images for a same entity profile of the social networking service. The social module 240 assigns the generated plurality of different profile images to the same entity profile. The assignment causes display of a first profile image among the plurality of different profile images to a first member of the social networking service and causes display of a second profile image among the plurality of different profile images to a second member of the social networking service.

Figure 7:
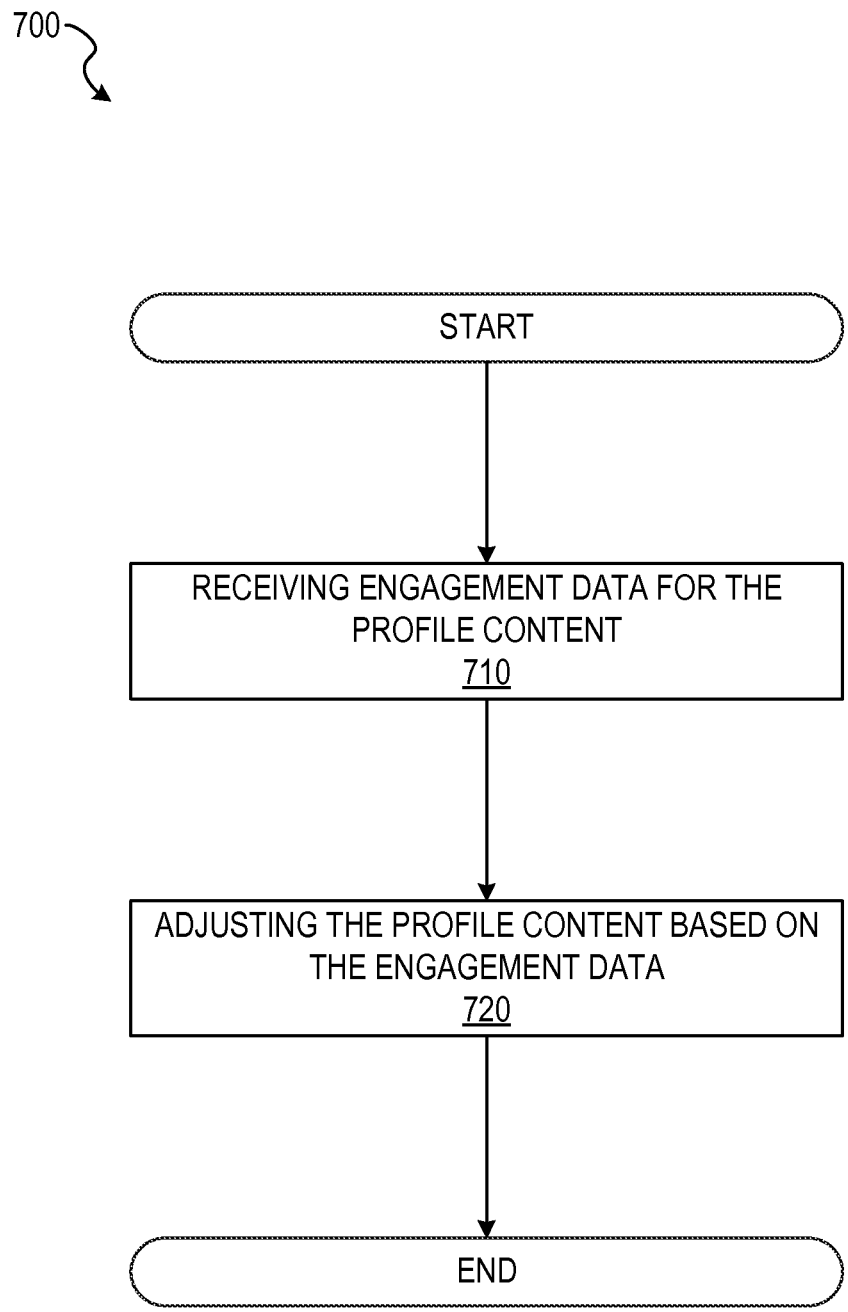
FIG. 7 is a flow diagram illustrating an example method for adjusting profile content according to engagement data, according to some example embodiments.

FIG. 7 is a flow diagram illustrating an example method 700 for adjusting profile content according to engagement data. The operations of the method 700 can be performed by components of the social promotion system 150, and are so described below for the purposes of illustration.

At operation 710, the communication module 220 receive engagement data for the profile content. In an example embodiment, the communication module 220 access the engagement data from the social networking service that stores engagement data for profiles and accounts of the social networking service (e.g., member identifiers that have viewed a particular profile). For example, the engagement data indicates a click, tap, or another member interaction or action associated with the profile content assigned to the entity profile. The engagement data can include a member identifier (e.g., operable to identify the member on the social networking service), engagement context data (e.g., time, device type, device location such as geolocation detected by a GPS component of a mobile device), and other data. In another example, if the profile content assigned to the entity profile is the cycling assembly of images, the engagement data can indicate a click, tap, or another member interaction or action pertaining to a particular image of the cycling assembly of images.

At operation 720, the content generation module 250 adjusts the profile content based on the engagement data. For instance, if a particular image of the cycling assembly of images receives a highest number of interactions, the content generation module 250 reorders the cycling assembly of images with the particular image being displayed first. In another instance, the content generation module 250 removes a particular image from the cycling assembly of images based on the engagement data (e.g., a particular image with little or no engagement from users as compared to other images). In another instance, if the engagement data indicates a particular member is not interested in the profile content, the content generation module 250 generates new profile content personalized to the particular member based on the member data of the particular member.

Figure 8:
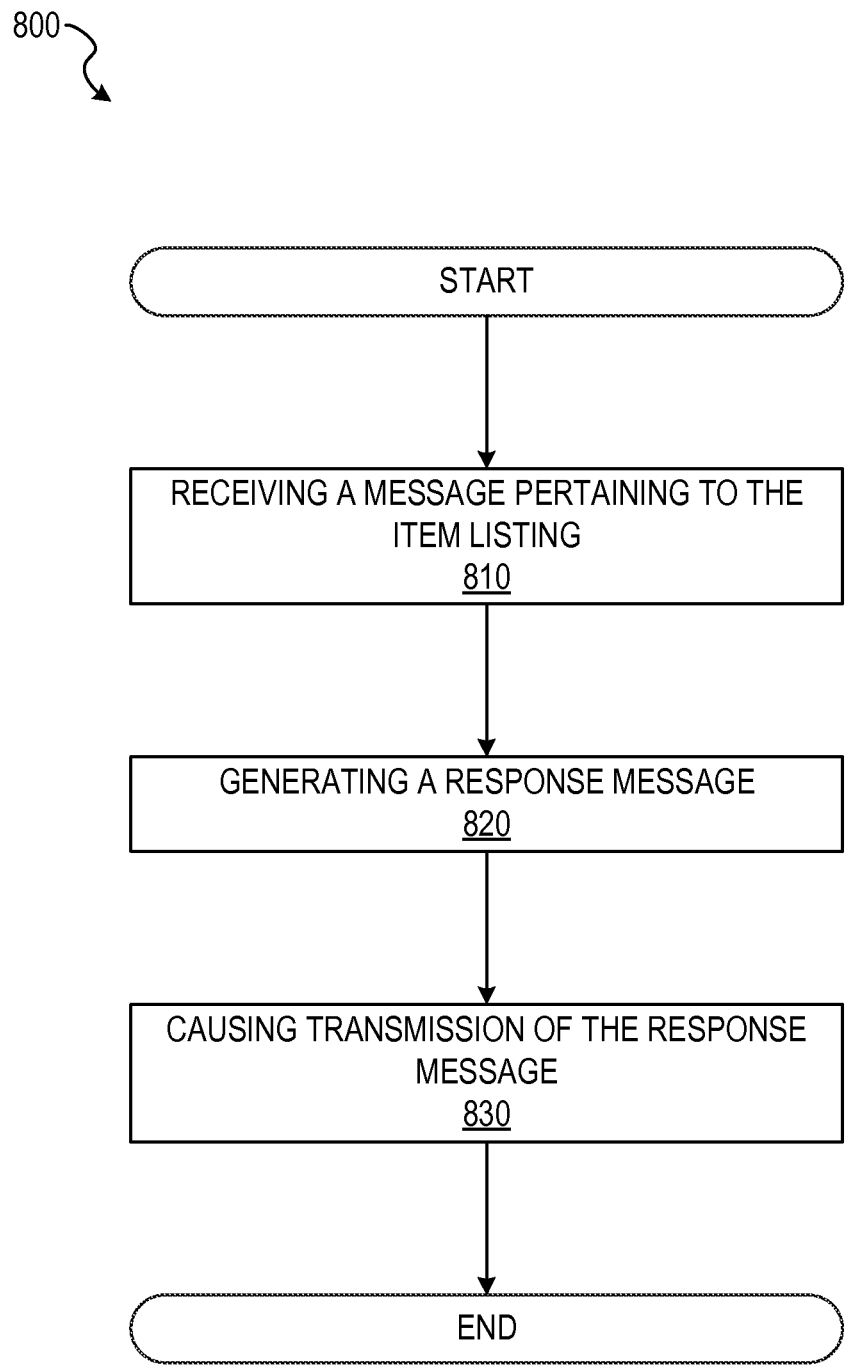
FIG. 8 is a flow diagram illustrating an example method for generating and transmitting social networking service response messages pertaining to the item listing, according to some example embodiments.

FIG. 8 is a flow diagram illustrating an example method 800 for generating and transmitting social networking service response messages pertaining to the item listing. The operations of the method 800 can be performed by components of the social promotion system 150, and are so described below for the purposes of illustration.

At operation 810, the communication module 220 or the social module 240 receives a message pertaining to the item listing from a particular member of the social networking service via the social networking service. For example, the particular member sends a message to the entity profile on the social networking service requesting more information associated with the item listing, indicating an interest in the item listing, or requesting purchase of the item listing.

At operation 820, the content generation module 250 or the item module 230 generates a response message that includes information pertaining to the item listing. For example, the item module 230 generates a response message that includes price, description, inventory data, or other item data in response to the message from the particular member. In some embodiments, the item module 230 extracts a message characteristic from the message received from the particular member and generates the response message based on the extracted message characteristic. For instance, the message characteristic may indicate a request for similar item listings or an inquiry as to availability in a particular size, particular color, or shipment date. The item module 230 then generates the response message with item data that is response to the message characteristic.

In further example embodiments, the response message includes an option to initiate a purchase of the item of the publication such as the item listing. For example, the response message comprises a link that when activated by the user executes code to facilitate purchase of the item of the item listing. In some instances, the link is a link to the publication at the publication system (e.g., a link to a item listing or a product listing on an e-commerce website).

At operation 830, the communication module 220 or the social module 240 causes transmission of the response message to a device of the particular member. For example, the social module 240 sends the response message to the device of the particular member via the social networking service. In another example, the communication module 220 sends the response message to the device of the user via a push notification, a text message, an email, or another communication modality.

Figure 9:
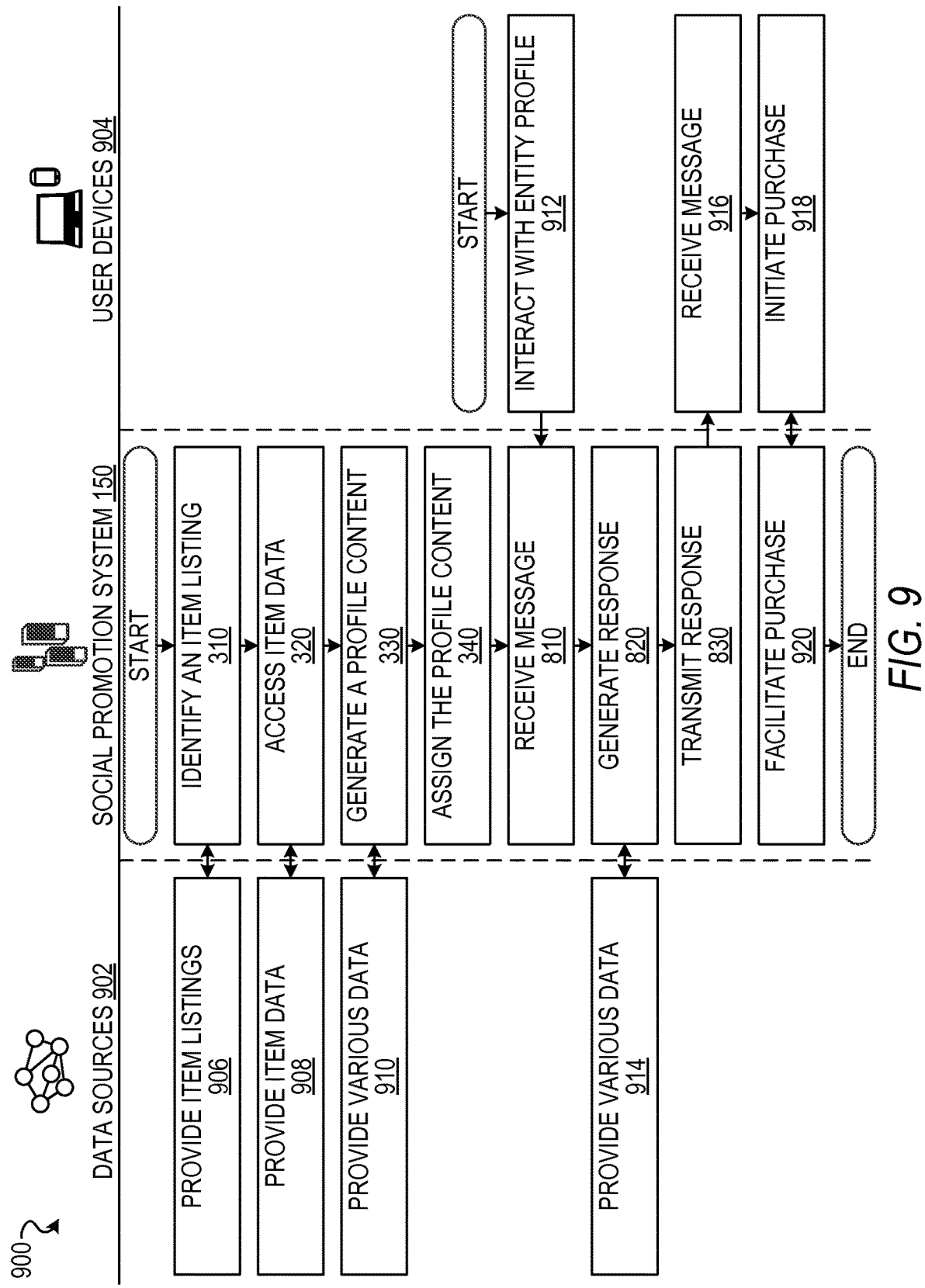
FIG. 9 is a swim-lane diagram illustrating example communications between a social promotion system, user devices, and data sources, according to some example embodiments.

To help illustrate the concepts discussed above, FIG. 9 is a swim-lane diagram 900 illustrating an example communications between the social promotion system, user devices, and data sources. The diagram 900 shows various communications between data sources 902 (such as the social networking service, an e-commerce website, a database, or a third-party server), the social promotion system 150, and user device 904 (e.g., the client device 110).

At operation 310, as discussed above, the item module 230 identifies an item listing. At operation 906, the data source 902 provides item listings to the social promotion system 150. That is to say, the item module 230 accesses a plurality of item listings provided by, for example, an e-commerce website or a particular local or remote database (e.g., the databases 126).

At operation 320, the item module 230 accesses item data for the item listing. As discussed above, the item data can include a wide variety of data for the item listing such as price, description, item images, and so on. At operation 908, the data source 902 provides the item data to the social promotion system 150. That is to say, the item module 230 accesses item data provided by, for example, the e-commerce website or a particular local or remote database (e.g., the databases 126).

At operation 330, the content generation module 250 generates the profile content using the item data. In further embodiments, at operation 910, the content generation module 250 is provided data accessed or retrieved from various data sources such as member data retrieved from the social networking service by the social module 240 or data from third party servers retrieved by the communication module 220.

At operation 340, the social module 240 assigns the profile content to the entity profile. For instance, the profile image generated by the content generation module 250 is assigned or caused to be assigned to a profile picture position of the entity profile. For example, the social module 240 communicates an instruction (e.g., via an API call) to the social networking service to update the entity profile with the profile image.

At another session at another time after operation 340 is performed, at operation 912, a user of the user devices 904 interacts with the entity profile and the social promotion system 150 receives an indication of the interaction at operation 810. For example, the user may send a message to the entity inquiring about a product or service via the social networking service. In another example, the user tap, clicks, or otherwise interacts with the entity on the social networking service (e.g., a profile view, a profile like, or another type of social media interaction).

At operation 820, the content generation module 250 or the item module 230 generates a response message for the received message. In some embodiments, at operation 914, the content generation module 250 uses data provided by various data sources such as member data retrieved by the social module 240 from the social networking service, item data retrieved by the item module 230, or data from third party service retrieved by the communication module 220.

At operation 830, the communication module 220 or the social module 240 causes transmission of the response message to the user device 904 of the particular user. At operation 916, the user devices 904 of the user receives the message. In some instances, the response message may facilitate a purchase of the item of the item listing. For instance, the response message can include a link to execute code to perform a purchase of the item by the user.

At operation 918, the user initiates a purchase of the item of the item listing and at operation 920, the purchase module 260 facilitates purchase of the item of the item listing. For instance, the user activates a purchase link included in the response message to execute code at the social promotion system 150 to initiate the purchase.

Figure 10:
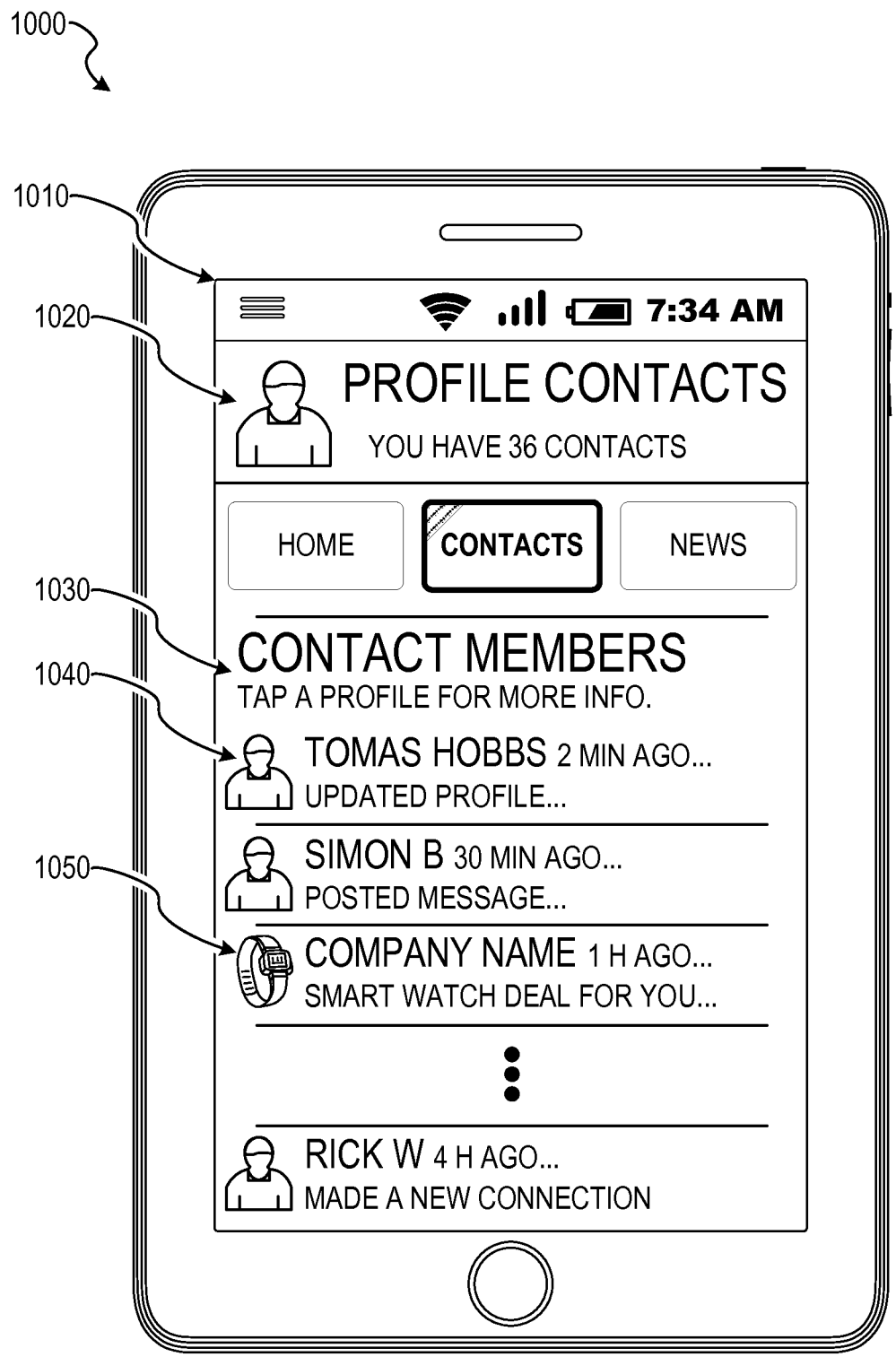
FIG. 10 is a user interface diagram depicting an example presentation of the generated profile content on a social networking service, according to some example embodiments.
Figure 11:
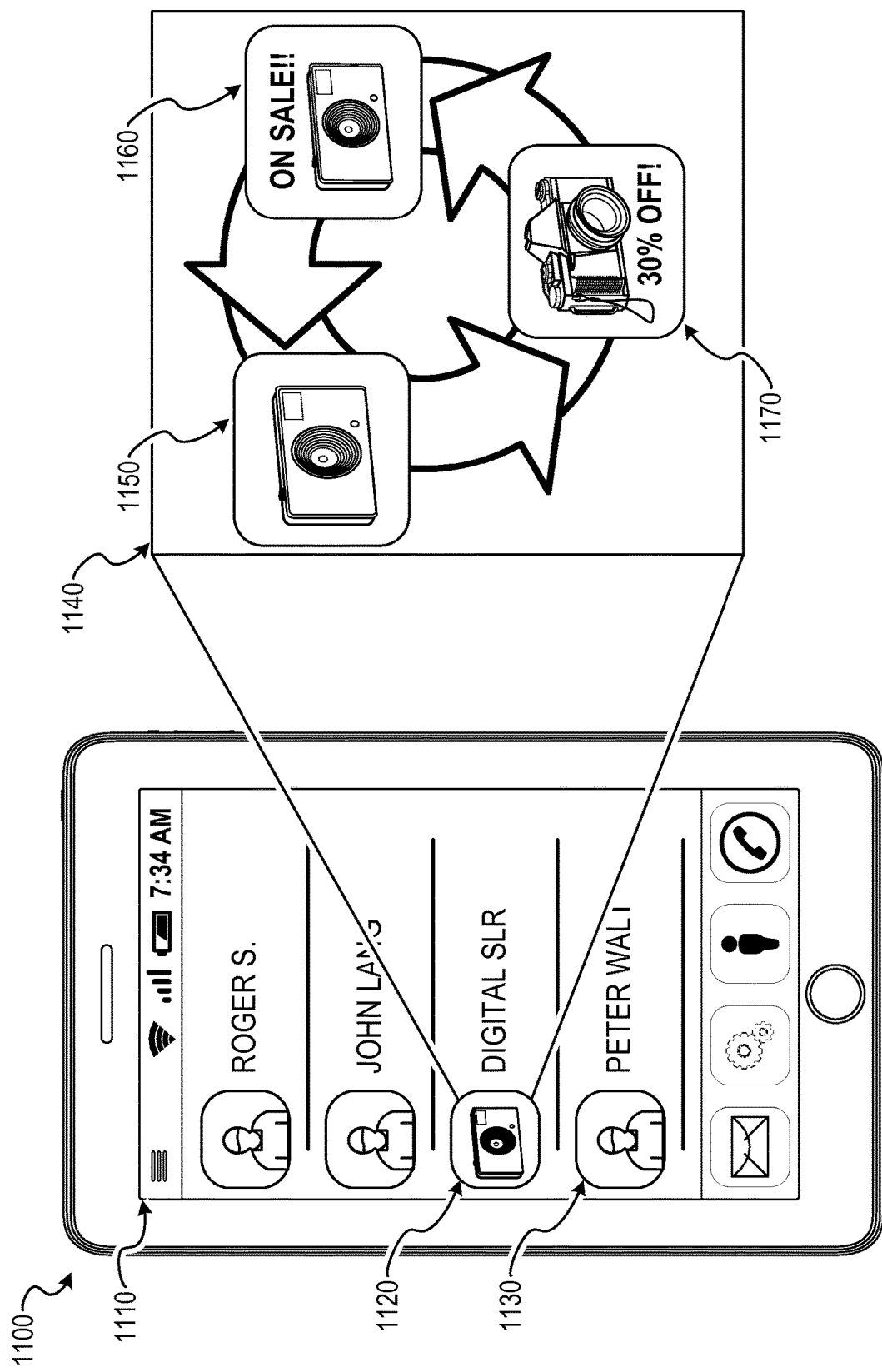
FIG. 11 is a user interface diagram depicting a further example presentation of the generated profile content on a social networking service, according to some example embodiments.
Figure 12:
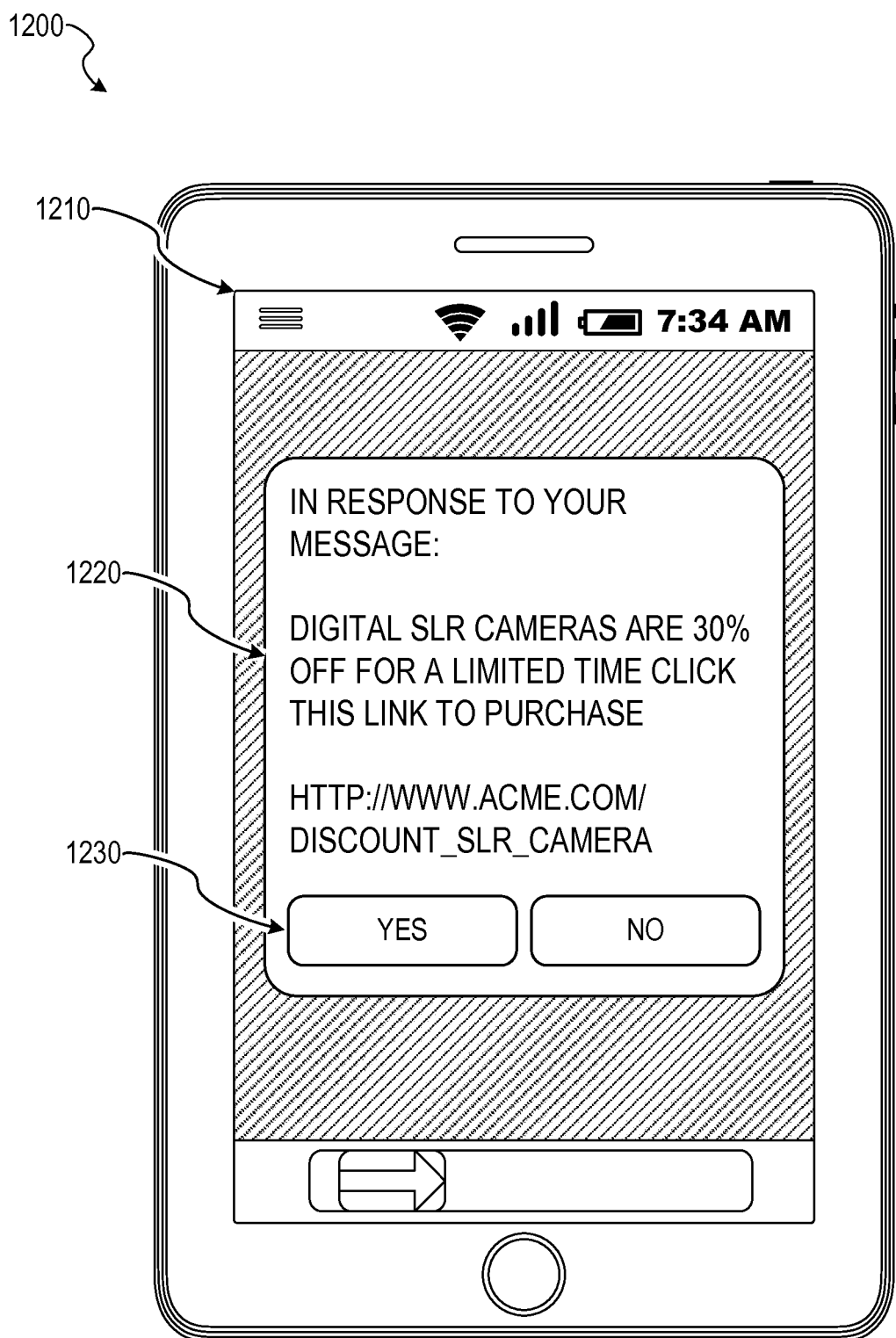
FIG. 12 is a user interface diagram depicting an example response message communicated to a particular user, according to some example embodiments.

FIGS. 10-12 depict example user interfaces for interactively presenting information to the user. Although FIGS. 10-12 depict specific example user interfaces and user interface elements, these are merely non-limiting examples; many other alternate user interfaces and user interface elements can be generated by the presentation module 210 and cause to be presented to the user. It will be noted that alternate presentations of the displays of FIGS. 10-12 can include additional information, graphics, options, and so forth. Alternatively, other presentations can include less information, or provide abridged information for easy use by the user.

FIG. 10 is a user interface diagram 1000 depicting an example presentation of the generated profile content on a social networking service. Example user interface 1010 includes a particular member's social networking profile 1020. In this example, the particular member is viewing contacts of the particular member on the social networking service. Section 1030 shows the contact members of the particular user. Element 1040 shows a member entry for a particular contact member of the user. Element 1050 is an example of a contact entry viewable by a member of the social networking service. The contact entry comprises contact information such as the generated profile image generated by the content generation module 250 and assigned to the profile picture position of the entity profile by the social module 240. In the user interface 1010, the profile image includes a particular item image and is viewable by the particular member in a similar way as other contact profile images are viewable. The element 1050 can comprise a still image, a GIF, a video, an animation, or another type of media (e.g., media with an audio or tactile output).

FIG. 11 is a user interface diagram 1100 depicting a further example presentation of the generated profile content on the social networking service. Example user interface 1110 includes element 1120 and element 1130. The element 1130 is an example contact member image of the user. The element 1120 is an example of profile content generated by the content generation module 250 and assigned to the entity profile by the social module 240. For instance, the element 1120 comprises a cycling assembly of images that show different item images such as images 1150, 1160, and 1170. Callout 1140 shows different phases, cycles, or positions of the cycling assembly of images. The content generation module 250 can change a current cycle of the cycling assembly of images in response to detecting a trigger such as a time trigger or a user interacting with the entity profile.

FIG. 12 is a user interface diagram 1200 depicting an example response message communicated to a particular user device (e.g., a smart phone). Example user interface 1210 includes a notification 1220. In various example embodiments, the presentation module 210 causes presentation of the notification 1220 to the user. For instance, the presentation module 210 communicates, to the user device, instructions to present the notification 1220. In some instances, the instructions include notification content, generated by the presentation module 210, such as a message (e.g., pertinent information) to be presented to the user. In example embodiments, the notification 1220 comprises a text message, such as a push notification (e.g., via a social networking service), Short Message Service (SMS) messages, Multimedia Messaging Service (MMS), Enhanced Messaging Service (EMS), and so forth. In other example embodiments, the notification 1220 comprises a push notification or another similar type of notification. In further example embodiments, the notification 1220 comprises interactive user interface elements such as user interface elements 1230 (e.g., activating the "YES" button may initiate the purchase and activating the "NO" button may dismiss the notification). In these example embodiments, the user interface elements 1230 provide the user an option to make a selection (e.g., through an SMS system, mobile application).

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-12 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 13:
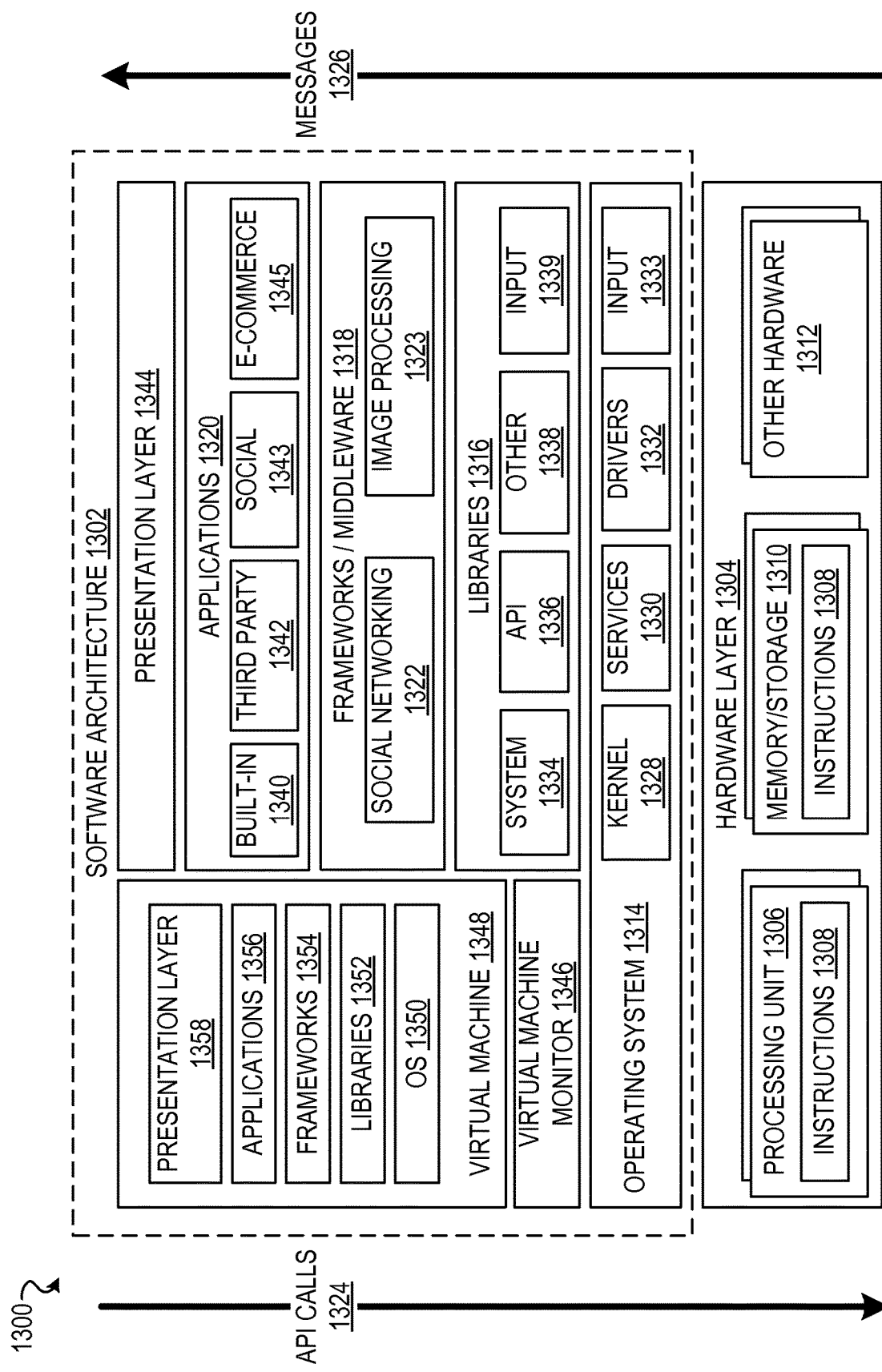
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 1-12. Hardware layer 1304 also includes memory and storage modules 1310, which also have executable instructions 1308. Hardware layer 1304 may also comprise other hardware 1312, which represents any other hardware of the hardware layer 1304, such as the other hardware illustrated as part of machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide the frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, BLUETOOTH® drivers, flash memory drivers, serial communication drivers (e.g., Universal Serial Bus (USB) drivers), WIFI® drivers, audio drivers, power management drivers, and so forth depending on the hardware configuration. In an example embodiment, the operating system 1314 includes input service 1333 that can provide various input processing services such as low-level access to touchscreen input data or other user input data.

The libraries 1316 may provide a common infrastructure that may be utilized by the applications 1320 or other components or layers. The libraries 1316 typically provide functionality that allows other software modules to perform tasks in an easier fashion than to interface directly with the underlying operating system 1314 functionality (e.g., kernel 1328, services 1330 or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPREG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules. In an example embodiment, the libraries 1316 include input libraries 1339 that provide input tracking, capture, or otherwise monitor user input such as touchscreen input that can be utilized by the gesture navigation system 160.

The frameworks/middleware 1318 (also sometimes referred to as middleware) may provide a higher-level common infrastructure that may be utilized by the applications 1320 or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 or other software components/modules, some of which may be specific to a particular operating system or platform. In an example embodiment, the frameworks/middleware 1318 include a social networking framework 1322 and an image processing framework 1323. The social networking framework 1322 can provide high-level support for social networking API calls, protocols, profile modification functions, content upload functions, and other functions associated with interfacing with one or more social networking services. The image processing framework 1323 can provide high-level support for various image processing functionality to facilitate content generation.

The applications 1320 include built-in applications 1340 or third party applications 1342. Examples of representative built-in applications 1340 may include, but are not limited to, a contacts application, a browser application, a book reader application, a location application, a media application, a messaging application, or a game application. Third party applications 1342 may include any of the built-in applications as well as a broad assortment of other applications. In a specific example, the third party application 1342 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 1342 may invoke the API calls 1324 provided by the mobile operating system such as operating system 1314 to facilitate functionality described herein. In an example embodiment, the applications 1320 include a social application 1343 that includes a portion of the social promotion system 150 as part of the application. In another example embodiment, the applications 1320 include an e-commerce application 1345 that includes a portion of the social promotion system 150.

The applications 1320 may utilize built-in operating system functions (e.g., kernel 1328, services 1330 or drivers 1332), libraries (e.g., system libraries 1334, API libraries 1336, and other libraries 1338), frameworks/middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware machine (such as the machine 1400 of FIG. 14, for example). The virtual machine 1348 is hosted by a host operating system (operating system 1314 in FIG. 14) and typically, although not always, has a virtual machine monitor 1346, which manages the operation of the virtual machine 1348 as well as the interface with the host operating system (e.g., operating system 1314). A software architecture executes within the virtual machine 1348 such as an operating system 1350, libraries 1352, frameworks/middleware 1354, applications 1356 or presentation layer 1358. These layers of software architecture executing within the virtual machine 1348 can be the same as corresponding layers previously described or may be different.

Figure 14:
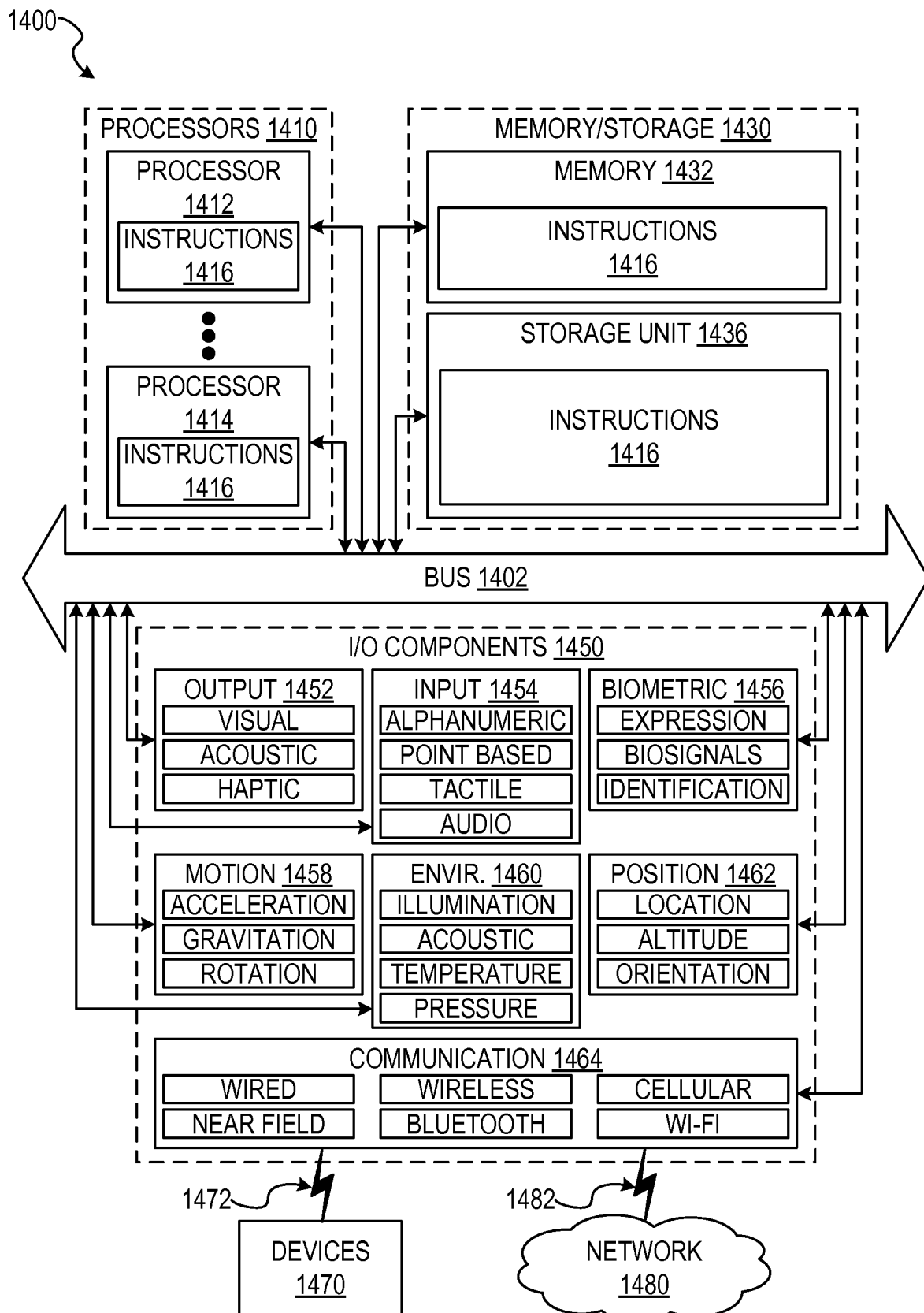
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein can be executed. For example, the instructions 1416 can cause the machine 1400 to execute the flow diagrams of FIGS. 3-9. Additionally, or alternatively, the instruction 1416 can implement the presentation module 210, the communication module 220, the item module 230, the social module 240, the content generation module 250, the purchase module 260, and so forth. The instructions 1416 transform the general, non-programmed machine into a particular machine programmed to carry out the described and illustrated functions in the manner described. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 can include processors 1410, memory/storage 1430, and I/O components 1450, which can be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1412 and processor 1414 that may execute instructions 1416. The term "processor" is intended to include multi-core processor that may comprise two or more independent processors (sometimes referred to as "cores") that can execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 can include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 can also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 can include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 can include output components 1452 and input components 1454. The output components 1452 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1450 can include biometric components 1456, motion components 1458, environmental components 1460, or position components 1462 among a wide array of other components. For example, the biometric components 1456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 can include acceleration sensor components (e.g., an accelerometer), gravitation sensor components, rotation sensor components (e.g., a gyroscope), and so forth. The environmental components 1460 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or other suitable device to interface with the network 1480. In further examples, communication components 1464 include wired communication components, wireless communication components, cellular communication components, Near Field Communication (NFC) components, BLUETOOTH® components (e.g., BLUETOOTH® Low Energy), WIFI® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 can detect identifiers or include components operable to detect identifiers. For example, the communication components 1464 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or other type of cellular or wireless coupling. In this example, the coupling 1482 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 can be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 can be transmitted or received using a transmission medium via the coupling 1472 (e.g., a peer-to-peer coupling) to devices 1470. The term "transmission medium" shall be taken to include any intangible medium that is capable of storing, encoding, or carrying the instructions 1416 for execution by the machine 1400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor configured to perform operations comprising:
identifying an item for sale on a network based marketplace, the identification based on an association between the item for sale and a first member of a social networking service;
identifying a plurality of images of the item for sale;
identifying an association between the item for sale and an entity having an entity profile of a social networking service where the entity is selling the item for sale, the entity profile having a profile image displayed to members of the social networking service when visiting a profile page of the entity and when viewing contact information for the entity, the members of the social networking service being different than the entity;
causing display to the first member of the social networking service in place of the profile image, an animation temporally cycling display of each image in the identified plurality of images of the item for sale by the entity, in response to a request by the first member of the social networking service to view the profile image;
identifying a second item for sale by the entity on the network based marketplace, the identification based on a second association between the second item for sale and a second member of the social networking service;
identifying a second plurality of images of the second item for sale; and
causing display to the second member of the social networking service in place of the profile image, a second animation temporally cycling display of each image of the identified second plurality of images of the second item for sale in response to a second request by the second member of the social networking service to view the profile image.

2. The system of claim 1, the operations further comprising:
identifying multiple items for sale that respectively represent multiple items available for purchase;
accessing item data for respective multiple items for sale;
generating an image for each of the multiple items for sale using the item data for the respective multiple items for sale; and
wherein the plurality of images is generated to include images for at least two different items for sale.

3. A method comprising:
identifying an item for sale on a network based marketplace, the identification based on an association between the item for sale and a first member of a social networking service;
generating, using a hardware processor, a plurality of images of the item for sale;
identifying an association between the item for sale and an entity having an entity profile of a social networking service where the entity is selling the item for sale, the entity profile having a profile image displayed to members of the social networking service when visiting a profile page of the entity and in response to viewing contact information for the entity, wherein the members of the social networking service are different than the entity;
causing, using the hardware processor, an animation to temporally cycle display of each image in the plurality of images of the item for sale by the entity to the first member of the social networking service, the animation provided in place of the profile image in a response to a request by the first member of the social networking service to view the profile image;
identifying a second item for sale by the entity on the network based marketplace, the identification based on a second association between the second item for sale and a second member of the social networking service;
identifying a second plurality of images of the second item for sale; and
causing display to the second member of the social networking service in place of the profile image, a second animation temporally cycling display of each image of the identified second plurality of images of the second item for sale in response to a second request by the second member of the social networking service to view the profile image.

4. The method of claim 3, further comprising:
identifying multiple items for sale that respectively represent multiple items available for purchase;
accessing item data for respective multiple items for sale;
generating an image for each of the multiple items for sale using the item data for the respective multiple items for sale; and
assembling the plurality of images to include the generated images for at least two different items for sale.

5. The method of claim 3, further comprising:
identifying a member of the social networking service that has formed a relationship with the entity on the social networking service; and
accessing member data of the identified member on the social networking service.

6. The method of claim 5, wherein the generating of the plurality of images is based on the member data of the identified member.

7. The method of claim 5, further comprising: ordering images of the plurality of images based on the member data of the identified member.

8. The method of claim 3, further comprising: receiving engagement data corresponding to a particular image among the plurality of images, wherein the engagement data indicates a member action of a member of the social networking service pertaining to the particular image; and removing the particular image from the plurality of images based on the engagement data.

9. A non-transitory machine-readable medium storing instructions that, when executed by at least one processor of a machine, cause the machine to perform operations comprising:
identifying an item for sale on a network based marketplace, the identification based on an association between the item for sale and a first member of a social networking service;
generating a plurality of images of the item for sale;
identifying an association between the item for sale and an entity having an entity profile of a social networking service where the entity is selling the item for sale, the entity profile having a profile image displayed to members of the social networking service when visiting a profile page of the entity and in response to viewing contact information for the entity, wherein the members of the social networking service are different than the entity;
causing an animation to temporally cycle display of each image in the plurality of images of the item for sale by the entity to the first member of the social networking service, the animation provided in place of the profile image in a response to a request by the first member of the social networking service to view the profile image,
identifying a second item for sale by the entity on the network-based marketplace, the identification based on a second association between the second item for sale and a second member of the social networking service;
identifying a second plurality of images of the second item for sale; and
causing display to the second member of the social networking service in place of the profile image, a second animation temporally cycling display of each image of the identified second plurality of images of the second item for sale in response to a second request by the second member of the social networking service to view the profile image.

10. The non-transitory machine-readable medium of claim 9, wherein the operations further comprise:
identifying multiple items for sale that respectively represent multiple items available for purchase;
accessing item data for respective multiple items for sale;
generating an image for each of the multiple items for sale using the item data for the respective multiple items for sale; and
assembling the plurality of images to include the generated images for at least two different items for sale.

11. The non-transitory machine-readable medium of claim 9, wherein the operations further comprise:
identifying a member of the social networking service that has formed a relationship with the entity on the social networking service; and
accessing member data of the identified member on the social networking service.

12. The non-transitory machine-readable medium of claim 11, wherein the generating the plurality of images is based on the member data of the identified member.

13. The non-transitory machine-readable medium of claim 11, wherein the operations further comprise: ordering images of the plurality of images based in part on the member data of the identified member.

14. The non-transitory machine-readable medium of claim 9, wherein the operations further comprise: receiving engagement data corresponding to a particular image among the plurality of images, wherein the engagement data indicates a member action of a member of the social networking service pertaining to the particular image; and removing the particular image from the plurality of images based on the engagement data.

15. The non-transitory machine-readable medium of claim 9, wherein the operations further comprise: causing the plurality of images to further cycle in response to a cycle trigger, wherein the cycle trigger is triggered in response to a member action associated with the entity profile of the social networking service.

16. The method of claim 3, wherein the animation displays images in the plurality of images of the item for sale by the entity in an order, the method further comprising reordering the display of the plurality of images of the item for sale by the entity such that an image receiving a highest number of member interactions is displayed first in the animation.

17. The method of claim 16, wherein the animation personalizes the display of the plurality of images of the item for sale by the entity for particular members of the social networking service based on interactions of the particular members of the social networking service with items for sale associated with the entity.

* * * * *